United States Patent [19]

Inagaki et al.

[11] Patent Number: 4,762,300
[45] Date of Patent: Aug. 9, 1988

[54] CONTROL VALVE FOR CONTROLLING FLUID PASSAGE

[75] Inventors: Mitsuo Inagaki; Hideaki Sasaya, both of Okazaki; Kenji Takeda, Aichi; Yoshiyuki Hattori, Toyoake; Yuzo Imoto, Kariya; Toshihiro Takei, Okazaki, all of Japan

[73] Assignees: Nippondenso Co., Ltd., Kariya; Nippon Soken, Inc., Nishio, both of Japan

[21] Appl. No.: 830,132

[22] Filed: Feb. 18, 1986

[30] Foreign Application Priority Data

Feb. 19, 1985 [JP] Japan ................................ 60-31708
Mar. 30, 1985 [JP] Japan ................................ 60-66850

[51] Int. Cl.$^4$ ............................................ F16K 31/02
[52] U.S. Cl. ............................. 251/129.06; 251/57; 60/545; 60/566
[58] Field of Search ................ 251/57, 129.06; 137/490, 491; 60/545, 566

[56] References Cited

U.S. PATENT DOCUMENTS

| | | | |
|---|---|---|---|
| 2,839,264 | 6/1958 | Trubert | 251/57 |
| 3,648,967 | 3/1972 | O'Neill et al. | 251/57 |
| 4,022,166 | 5/1977 | Bart | 251/129.06 X |
| 4,322,055 | 3/1982 | Baumann | 251/57 |
| 4,471,256 | 7/1984 | Igashira et al. | |

FOREIGN PATENT DOCUMENTS

| | | |
|---|---|---|
| 0065451 | 11/1982 | European Pat. Off. |
| 2610579 | 9/1977 | Fed. Rep. of Germany |
| 2647072 | 4/1978 | Fed. Rep. of Germany |
| 3233161 | 10/1983 | Fed. Rep. of Germany |
| 2425599 | 7/1979 | France |
| 59-69578 | 4/1984 | Japan |
| 2094940 | 9/1982 | United Kingdom |

OTHER PUBLICATIONS

Patents Abstracts of Japan, vol. 7, No. 275 (M-261) [1420], 8th Dec. 1983, page 95 M 261, JP-A-58 152 986 (Nippon Jidosha Buhin Sogo Kenkyusho K.K.) 10-0-9-1983.

Primary Examiner—Arnold Rosenthal
Attorney, Agent, or Firm—Cushman, Darby & Cushman

[57] ABSTRACT

A piston in a first cylinder is driven as a piezoelectric element group, which includes a plurality of laminar piezoelectric elements stacked in layers, extends or contracts. A second cylinder is formed so as to connect with a first fluid pressure chamber which is defined in the first cylinder by the piston. A piston-shaped valve member is disposed in the second cylinder. The valve member is urged toward the first fluid pressure chamber by a spring. The first fluid pressure chamber is supplied with a fluid whose pressure is set by means of a selector valve. When the selector valve is closed, the fluid pressure chamber is defined as an independent compartment. In this state, high voltage is applied to the piezoelectric element group to elongate it, thereby driving the piston. Thus, the valve member is actuated by the fluid pressure inside the first fluid pressure chamber, and a fluid passage is opened and closed by the valve member.

11 Claims, 6 Drawing Sheets

F I G. 12
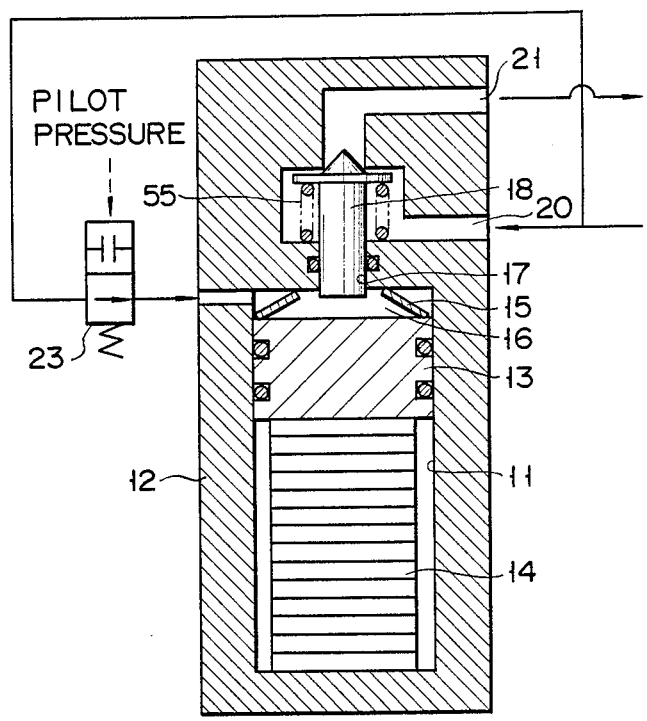

CONTROL VALVE FOR CONTROLLING FLUID PASSAGE

BACKGROUND OF THE INVENTION

The present invention relates to a control valve for controlling a fluid passage, and more specifically to a control valve effectively used as an fluid pressure passage control valve, adapted to open and close a passage for fluid pressure supplied from a master cylinder to, for example, wheel cylinders of a braking system of an automobile provided individually for wheels of the vehicle, and capable of executing braking force control, such as antiskid control, with high response characteristics.

In a conventional braking system of an automobile, a master cylinder produces an fluid pressure in response to a force with which a brake pedal is worked, and the pressure is transmitted to wheel cylinders arranged individually for wheels of the vehicle. In each wheel cylinder, a brake piston is driven by the supplied fluid pressure so that a braking force responsive to the working force on the pedal acts on each corresponding wheel.

In performing a braking operation on the braking system constructed in this manner, if a strong braking force is applied to a wheel, the wheel may sometimes lock and slip on a road surface. In such a case, it is necessary to execute antiskid control such that the slip between wheel and road surface is quickly removed to increase the contact resistance between them, thereby ensuring stable driving of the vehicle. The antiskid control may be effected by manually adjusting the working force on the brake pedal. It is desirable, however, that the braking force on the slipped wheel should automatically be reduced when a locked state of the wheel is detected.

A system for such automatic antiskid control has conventionally been proposed. In this system, a valve mechanism is provided in each of hydraulic circuits arranged individually between a master cylinder and wheel cylinders, and the braking force is reduced by discharging braking fluid from that wheel cylinder which corresponds to the slipped wheel.

Usually, a solenoid-operated valve is used as a fluid control valve for operating the hydraulic circuit. In this case, the fluid pressure passage is opened and closed electrically. In the solenoid valve, however, a solenoid coil for supplying exciting current has an inductor, so that the valve plug is actuated with a delay after the solenoid coil is energized. Thus, it is hard to obtain high response characteristics suited to antiskid control.

In consideration of these circumstances, piezoelectric elements, as a high-response drive source, may be used in place of the solenoid mechanism. The coefficient of thermal expansion of these elements is as low as $1 \times 10^{-6}/°$ C., while those of a mechanism for supporting the elements and other members constituting the control valve range from $12 \times 10^{-6}/°$ C. to $23 \times 10^{-6}/°$ C. Thus, there is a considerable difference between these values.

When using the control valve including the piezoelectric elements, therefore, if the temperature of the control valve section or that of a fluid as an object of control greatly changes, a difference in thermal displacement related to thermal expansion or contraction is caused between the piezoelectric elements and other members. Thus, even with the same control instruction, the opening of the valve plug of the control valve varies with temperature conditions. It is therefore difficult to constantly maintain satisfactory conditions for high-accuracy control.

More specifically, when using the control valve with the piezoelectric elements as its drive source in a motor vehicle, the working temperature of the valve widely ranges from $-30°$ to $+120°$ C. Accordingly, the control valve cannot easily maintain its normal functions.

SUMMARY OF THE INVENTION

An object of the present invention is to provide a control valve for opening and closing a fluid passage, enjoying satisfactory response characteristics in operation and adapted for effective control of, e.g., hydraulic circuits for antiskid control in a braking system.

Another object of the invention is to provide a control valve specifically using piezoelectric elements as its drive source for higher response characteristics, and capable of maintaining conditions for high-accuracy control over a wide temperature range.

Still another object of the invention is to provide a control valve specially designed for miniaturization and capable of opening and closing a fluid passage with a satisfactory response characteristic and high accuracy, thus ensuring high-speed, high-accuracy fluid control of hydraulic circuits of a braking system for passenger vehicles and various industrial machines.

In a control valve for operating a fluid passage according to the present invention, a piston in a cylinder is driven by a piezoelectric element group which includes a plurality of laminar piezoelectric elements stacked in layers, and a compressed control fluid is supplied to a fluid pressure chamber which is defined in the cylinder by the piston. A voltage is applied to the piezoelectric elements so that the element group extends or contracts in accordance with the applied voltage to control the piston in movement. The capacity of the fluid pressure chamber is changed in response to the movement of the piston. A piston-shaped valve member is inserted in another cylinder which connects with the fluid pressure chamber. As the chamber changes in capacity, the valve member is driven to control the fluid passage.

According to the control valve constructed in this manner, if high voltage is applied to the piezoelectric elements constituting the piezoelectric element group, the element group is extended in accordance with the applied voltage, so that the piston is driven in a direction to reduce the capacity of the fluid pressure chamber. As a result, the valve member is moved away from the chamber, and the fluid passage is controlled by a valve plug which is formed integrally on the valve member.

Since the fluid pressure chamber is pressurized with fluid to a predetermined pressure, the fluid pressure inside the chamber can be kept at a predetermined level, despite the difference in the coefficient of thermal expansion between the piezoelectric element group and members constituting the piston section, or change of the chamber capacity caused by temperature change, if any. In response to the moved distance of the piston in the cylinder, the valve member is driven for the control of the fluid passage without being influenced by temperature change.

BRIEF DESCRIPTION OF THE DRAWINGS

FIG. 12 is a sectional view illustrating a ninth embodiment of the invention.

DETAILED DESCRIPTION OF THE PREFERRED EMBODIMENTS

Figure 1:
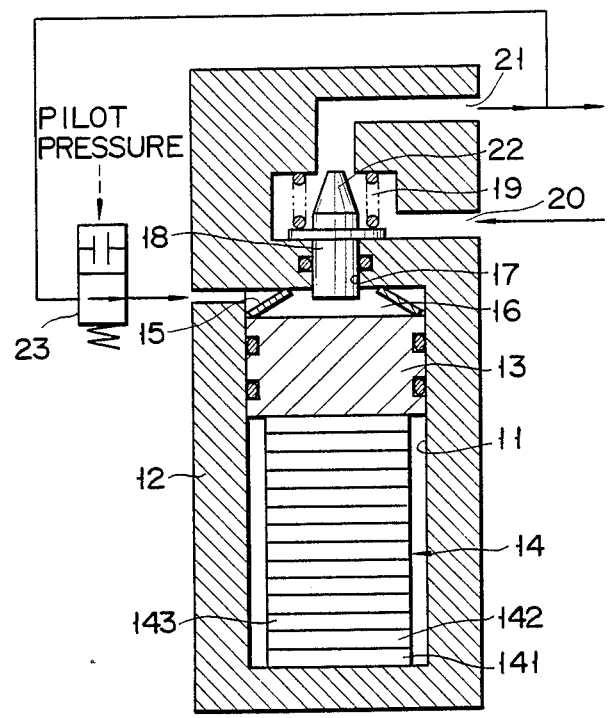
FIG. 1 is a sectional view illustrating the construction of a control valve according to a first embodiment of the present invention.

FIG. 1 shows a fundamental embodiment of a control valve for controlling a fluid passage. In FIG. 1, first cylinder 11 is formed inside case 12 made of, e.g., metal. First piston 13 is movably fitted in cylinder 11. Piston 13 is supported by piezoelectric element group 14. Spring mechanism 15 is used to urge piston 13 toward element group 14. Thus, piston 13 is located in a position depending on the length of group 14, defining fluid pressure chamber 16 in cylinder 12.

Piezoelectric element group 14 is a laminate structure formed of a plurality of laminar piezoelectric elements 141, 142, . . . . Electrode plates (not shown) are sandwiched between elements 141, 142, . . . , so that the elements are connected in parallel with one another by means of the plates. Voltage signals are applied to the parallel-connected elements 141, 142, .... If supplied with high voltage, the elements are extended in thickness to elongate element group 14.

More specifically, if high voltage is applied to piezoelectric element group 14, the group is extended to move piston 13 against the urging force of spring mechanism 15 in a direction such that fluid pressure chamber 16 is reduced in capacity. If the voltage applied to group 14 is lowered, the element group is shortened, so that piston 13 is moved by the urging force of mechanism 15 in a direction to increase the capacity of chamber 16.

Second cylinder 17 smaller in diameter than piston 13 is formed coaxial with first cylinder 11, opening into fluid pressure chamber 16. Cylinder 17 is penetrated by valve member 18 which constitutes a second piston whose active area is smaller than that of the first piston. Member 18 is urged toward chamber 16 by spring 19.

If high voltage is applied to piezoelectric element group 14 so that fluid pressure chamber 16 is reduced in capacity by piston 13, valve member 18 is actuated against the urging force of spring 19. If element group 14 is contracted without the supply of any voltage, member 18 is urged toward chamber 16 by spring 19.

As valve member 18 moves corresponding to the contraction or extension of piezoelectric element group 14, valve plug 22 opens or closes the fluid passage between first and second ports 20 and 21. More specifically, if high voltage is applied to element group 14, member 18 is moved from the position shown in FIG. 1 against the urging force of spring 19, so that plug 22 closes the fluid passage. If no voltage is applied to group 14, member 18 is located in the position of FIG. 1, so that the passage between first and second ports 20 and 21 is opened.

A suitable high-pressure fluid is supplied to fluid pressure chamber 16 through selector valve 23. In this embodiment, the fluid is fed from second port 21 so that the fluid pressure inside chamber 16 is adjusted to a specified level. Valve 23 is switched in accordance with a pilot pressure. The pilot pressure is produced when high voltage is applied to piezoelectric element group 14 so that piston 13 is moved in the direction to reduce the capacity of fluid pressure chamber 16. Thus, the pilot pressure causes chamber 16 to become a closed container.

According to a control valve constructed in this manner, when it is in a normal state such that high voltage is not applied to piezoelectric element group 14, the element group is contracted, and the fluid passage between first and second ports 20 and 21 is open, as shown in FIG. 1. Thereupon, the fluid from second port 21 is fed into fluid pressure chamber 16 through selector valve 23, and the fluid pressure inside chamber 16 is adjusted to a value such that valve member 18 is not actuated by the urging force of spring 19.

In this state, if an instruction for a closure of the control valve is given, the pilot pressure is produced correspondingly, so that selector valve 23 is closed. As a result, high voltage is applied to piezoelectric elements 141, 142, ... which constitute piezoelectric element group 14. Thus, element group 14 is extended, and piston 13 is driven in the direction to reduce the capacity of fluid pressure chamber 16. In this case, since valve 23 is closed, the fluid pressure inside chamber 16 rises as piston 13 moves. Accordingly, valve member 18 is driven against the urging force of spring 19, so that the fluid passage connecting first and second ports 20 and 21 is closed by valve plug 22.

In this control valve, if the ambient temperature greatly increases, the space between piston 13 and valve member 18 and the capacity of fluid pressure chamber 16 change due to the substantial difference in the rate of thermal expansion between the materials of element group 14 and case 12. However, since the fluid under a predetermined pressure is continually fed into chamber 16 through selector valve 23, the fluid pressure inside chamber 16 can be kept constant without being influenced by the temperature change. Thus, if valve 23 is closed and high voltage is applied to element group 14 to actuate piston 13, the action of piston 13 is precisely reciprocated in that of valve member 18, permitting accurate switching control of the fluid passage.

Figure 2:
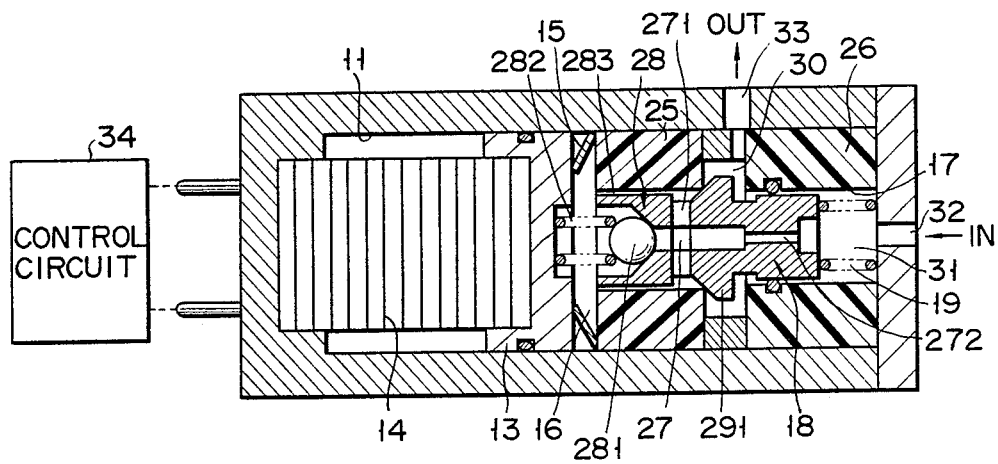
FIG. 2 is a sectional view showing a second embodiment of the invention.

FIG. 2 shows a second embodiment of the control valve of the invention. This valve is used, for example, to switch hydraulic circuits of a braking system of a vehicle. In FIG. 2, seat member 25 and guide member 26 are fixedly arranged side by side in first cylihder 11. Fluid pressure chamber 16 is defined between member 25 and piston 13 which is moved by piezoelectric element group 14. Piston 13 is urged toward element group 14 by spring mechanism 15.

Arranged in series as aforesaid, seat member 25 and guide member 26 are formed with coaxial second cylinder 17. Valve member 18 is movably inserted in cylinder 17. Member 18 is formed with fluid passage 27 along its central axis. Check valve member 28 is formed on member 18 on the side of fluid pressure chamber 16, and piston member 29 on the opposite side. Member 28, which includes steel ball 281 and spring 282, allows the fluid to flow only from passage 27 to chamber 16. A narrow gap 283 is defined between the outer peripheral surface of member 28 and second cylinder 17. The fluid produces a small flow between passage 27 and chamber 16 through gap 283.

Piston member 29 includes tapered valve plug 291. Outlet passage 30 is formed between seat member 25 and guide member 26, corresponding in position to plug 291. Valve member 18 is urged toward fluid pressure chamber 16 by spring 19 so that a slanting surface of plug 291 abuts against an edge portion of member 25. A selector passage is defined between outlet passage 30 and branch passage 271 around valve member 18. Valve plug 291 selectively blocks the selector passage as plug 291 abuts against member 25. Thus, passage 30 is disconnected from branch passage 271 which diverges from fluid passage 27 in member 18.

Second fluid pressure or pilot chamber 31 is defined beside piston member 29 of valve member 18 so that the fluid in chamber 31 is fed into fluid passage 27 of member 18. In this case, restriction 272 for restricting the fluid flow is formed in that portion of passage 27 which corresponds to piston member 29. Fluid inlet hole 32 is formed in chamber 31, and outlet hole 33 in outlet passage 30.

According to the control valve constructed in this manner, if no voltage is applied to piezoelectric element group 14 so that group 14 is contracted, valve member 18 is urged toward first fluid pressure chamber 16 by spring 19, cutting off fluid passage 27 from outlet passage 30, as shown in FIG. 2.

Here let it be supposed that inlet passage 32 of the control valve is supplied with high-pressure braking fluid from, for example, a master cylinder of a braking system for a vehicle. Thereupon, the fluid pressure acts on steel ball 281 of check valve member 28 through restriction 272. As a result, valve 28 is opened against the urging force of spring 282 to allow the braking fluid to be fed into first fluid pressure chamber 16. In this case, the fluid pressure produces, at valve plug 291, a force opposite in direction to the force to close passage 32 and acting on valve member 18. Since this force can be made substantially equivalent to an fluid pressure acting in second fluid pressure chamber 31, member 18 can be held in the position shown in FIG. 2.

If a high voltage of, e.g., 300 to 500 volts is applied to piezoelectric element group 14 in this state, group 14 extends. As a result, piston 13 is moved in the direction to reduce the capacity of first fluid pressure chamber 16, against the urging force of spring mechanism 15. Valve member 18 is moved at the same time. Accordingly, valve plug 291 separates from the edge portion of seat member 25 to form a passage between fluid passage 27 and outlet passage 30, thereby connecting inlet and outlet holes 32 and 33.

When the fluid passage is thus formed to permit a fluid flow from inlet hole 32 to outlet hole 33, the pressure on the lower-course side of restriction 272 in the passage becomes lower than that on the upper-course side. Accordingly, the fluid in first fluid pressure chamber 16, whose internal pressure is equal to the pressure on the upper-course side of restriction 272, starts to flow through gap 283 into fluid passage 27. Valve member 18 is then driven by the urging force of spring 19 to cut off passage 27 from outlet passage 30.

In this state, if the high voltage applied to piezoelectric element group 14 is removed, the element group, which has so far been in the extended state, is contracted, allowing piston 13 to move in the direction to increase the capacity of first fluid pressure chamber 16. In this case, the fluid is fed from fluid passage 27 into first fluid pressure chamber 16 through check valve member 28.

Here it is to be supposed that a specified voltage is pulsatively applied to piezoelectric element group 14, and that the pulse duration is $t_1$ which is shorter than time interval T required for the extension of element group 14 to its maximum length L. Then, every time the pulsative voltage rises, piston 13 is driven in the direction to reduce the capacity of first fluid pressure chamber 16. When piston 13 is moved by distance $l_1$ ($<L$), the voltage supplied to element group 14 falls, so that the group contracts to move piston 13 in the direction to increase the capacity of chamber 16. In this case, the time interval for the impression of the voltage on element group 14 is short, so that there is no time for the fluid to flow from chamber 16 into fluid passage 27 through gap 283. When the applied voltage falls, therefore, the fluid in passage 27 flows through check valve member 28 into chamber 16. Then, valve member 18 is moved toward first fluid pressure chamber 16 with delay.

Thus, if the pulsative voltage is applied to piezoelectric element group 14 at, e.g., 100 to 500 Hz, the fluid pressure inside first fluid pressure chamber 16 is kept at a level corresponding to the extended state caused when the voltage with pulse duration $t_1$ is supplied. Also, valve member 18 is kept in the moved position at distance $l_1$. As a result, the fluid passage area between inlet and outlet holes 32 and 33 is set to correspond to duration $t_1$, so that the quantity of fluid flowing through the fluid passage corresponds to the pulse duration. Thus, if the pulse duration is set to $t_2$ ($\leq T$) longer than $t_1$, valve member 18 is moved distance $l_2$, and the quantity of the fluid delivered to outlet hole 33 increases.

Thus, the fluid passage between inlet and outlet holes 32 and 33 can be opened and closed by controlling the impression of the pulsative voltage on piezoelectric element group 14 by means of control circuit 34. Also, the opening of the passage can be varied by controlling the pulse duration and pulse frequency. In this case, the time interval between the voltage supply to element group 14 and the extension of the group to a predetermined degree, i.e., response speed, is approximately 0.0005 second. Thus, there may be provided a fluid control valve with a very high response characteristic.

Figure 3:
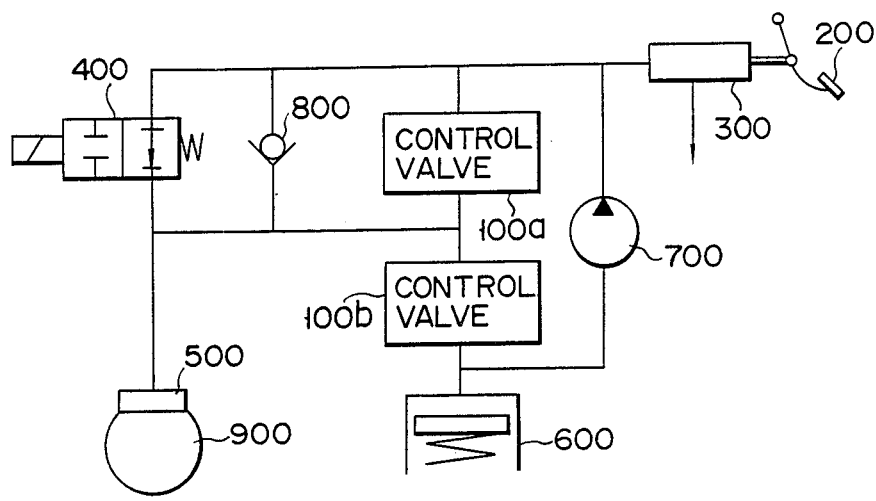
FIG. 3 is a diagram showing the configuration of a braking system for a vehicle using the control valve of FIG. 2.

FIG. 3 shows a specific configuration of an antiskid system of a vehicle braking device using control valves 100a and 100b as described above. In normal braking control, fluid pressure is produced in master cylinder 300 by working brake pedal 200, and is supplied to wheel cylinder 500 through solenoid valve 400. As a result, a braking force corresponding to the force applied to pedal 200 is produced in wheel 900 which corresponds to cylinder 500. At this time, valves 100a and 100b are closed. When pedal 200 is released, the fluid pressure inside cylinder 500 is returned to cylinder 300 through check valve 800, so that the braking force is removed from wheel 900.

If wheel 900, with brake pedal 200 down, locks and begins to cause skidding, this situation is detected by, for example, a wheel speed sensor (not shown). Thus, solenoid valve 400 is closed, and hydraulic pump 700 is actuated.

A detection signal indicative of the skidding gives an instruction to the control circuit of control valve 100b such that the valve is opened to feed braking fluid from wheel cylinder 500 into reservoir 600. Thus, the fluid pressure inside cylinder 500 is lowered, so that wheel 900 unlocks.

When the rotating speed of wheel 900 increases to a predetermined value or more, control valves 100b and 100a are closed and opened, respectively. Thereupon, fluid pressure produced by hydraulic pump 700 is fed into wheel cylinder 500 via valve 100a, and the braking force acting on wheel 900 increases again. Thus, wheel 900 is adjusted to a proper skid for optimum braking force control.

As described above, the fluid pressure inside wheel cylinder 500 can be regulated by selectively operating control valves 100a and 100b. The changing pressure may be controlled on the basis of the opening of valves 100a and 100b, that is, the frequency and pulse width of control pulse voltage applied to the valves. To attain this, a voltage of 300 volts is applied to the piezoelectric element groups of valves 100a and 100b at 200 or 400 Hz. Pulse voltages at 200 and 100 Hz may alternatively be applied to valve 100a with valve 100b closed. Quick and slow compression modes for cylinder 500 are established by applying the pulse voltages at 200 and 100 Hz, respectively, to valve 100a.

Moreover, a quick or slow decompression mode for wheel cylinder 500 is established alternatively by applying the pulse voltage of 200 or 100 Hz to control valve 100b with valve 100a closed.

Figure 4A:
FIGS. 4A and 4B are diagrams individually showing control voltage signals supplied to two control valves used in the braking system of FIG. 3.
Figure 4B:
Figure 4C:
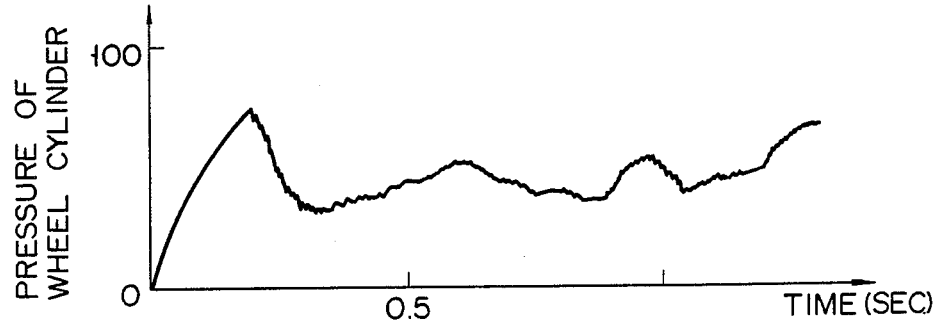
FIG. 4C is a diagram showing a variation of fluid pressure of a wheel cylinder in response to control by the control valves.

FIGS. 4A and 4B show control voltages supplied to the piezoelectric element groups of control valves 100a and 100b, respectively. The fluid pressure in wheel cylinder 500 is changed as shown in FIG. 4C by operating valves 100a and 100b in accordance with voltage signals indicative of the control voltages. Thus, the braking force acting on wheel 900 is controlled in accordance with the fluid pressure.

Figure 5:
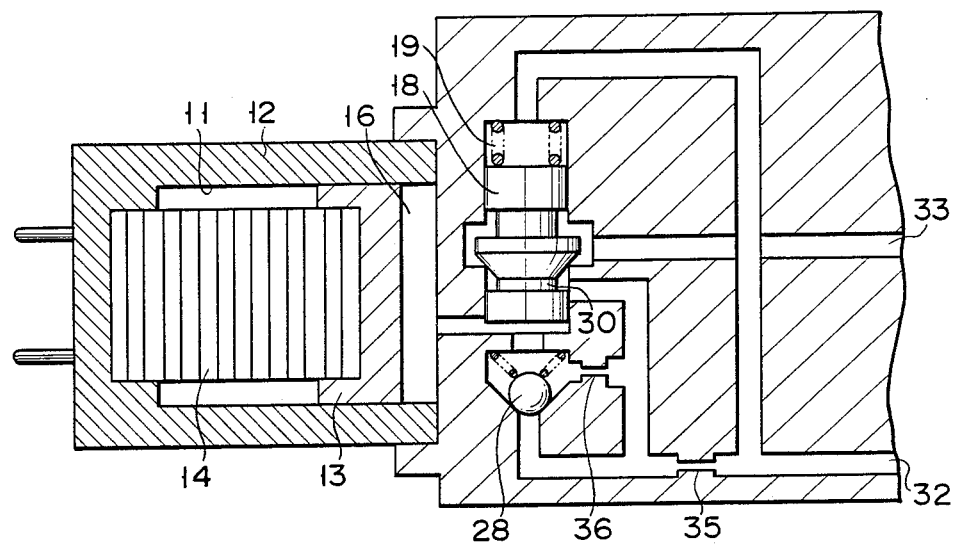
FIGS. 5 and 6 are sectional views illustrating third and fourth embodiments of the invention, respectively.

FIG. 5 shows a third embodiment of the present invention. In FIG. 5, like reference numerals are used to designate like components as shown in FIG. 2. In this embodiment, check valve member 28 and the fluid passage are formed independently of valve member 18. The fluid from inlet hole 32 is supplied to member 28 through first restriction 35, and then to first fluid pressure chamber 16. Chamber 16 communicates with outlet passage 30 by means of second restriction 36, which serves in the same manner as gap 283 of the control valve of FIG. 2. In the control valve of the third embodiment, as in the one shown in FIG. 2, the fluid passage between inlet and outlet holes 32 and 33 is opened or closed by controlling the voltage applied to piezoelectric element group 14.

Figure 6:
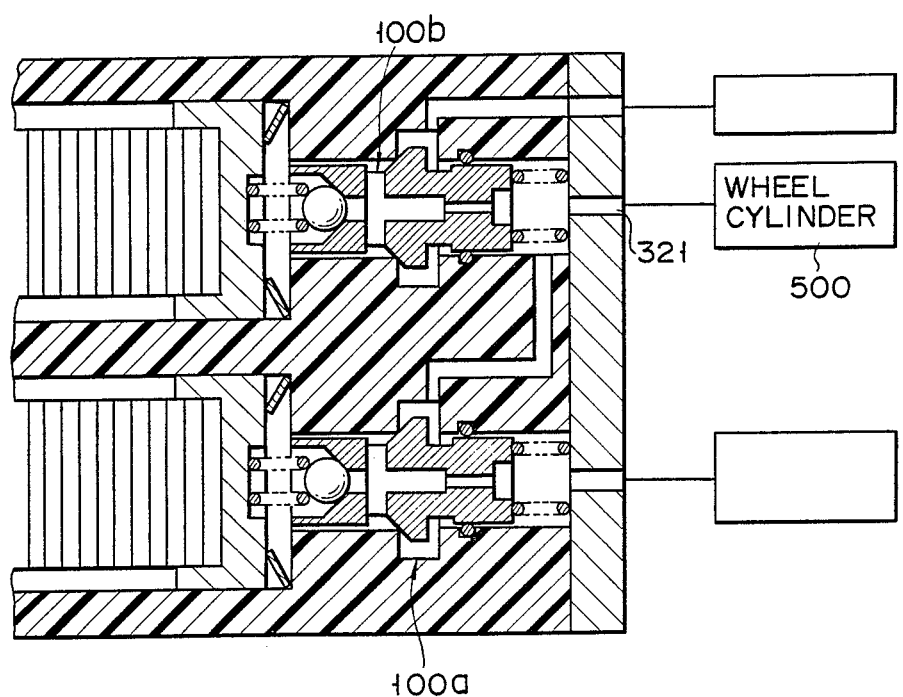

FIG. 6 shows a fourth embodiment used in a braking system capable of antiskid control as shown in FIG. 3. In this embodiment, two control valves 100a and 100b shown in FIG. 2 are combined together. Inlet and outlet holes 322 and 332 of valve 100b are connected to wheel cylinder 500 and reservoir 600, respectively. Inlet hole 321 of valve 100a is connected to master cylinder 300, while outlet hole 331 communicates with second fluid pressure chamber 162 of valve 100b by means of fluid passage 37.

Figure 7:
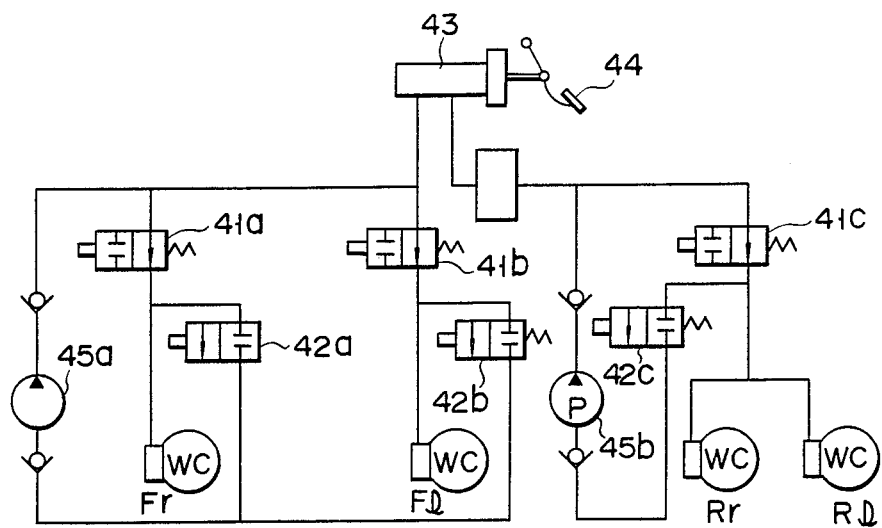
FIG. 7 is a diagram illustrating a modification of the vehicle braking system.

FIG. 7 shows another example of a vehicle braking system using the control valve. In this case, the skidding control of rear wheels Rr and Rl as driving wheels and front wheels Fr and Fl as driven wheels is performed by means of three normally-open control valves 41a, 41b and 41c and three normally-closed control valves 42a, 42b and 42c.

Fluid pressure produced in master cylinder 43 in response to the operation of brake pedal 44 is supplied through control valves 41a to 41c to wheel cylinders WC which constitute braking systems of the individual wheels. Thus, a braking force responsive to the operation of pedal 44 acts on each wheel independently.

Fluid pressures of wheel cylinders WC set for the individual wheels are released by means of pumps 45a and 45b when control valves 42a to 42c are open. Valves 42a to 42c serve to reduce the braking force.

If right-hand rear wheel Rr, for example, locks and causes a slip between itself and a road surface when brake pedal 44 is worked, the locking of the wheel is detected by a wheel rotation sensor (not shown) or the like, and an antiskid control instruction for wheel Rr is given. The control instruction closes control valve 41c which is set in a hydraulic circuit for feeding fluid pressure to the wheel cylinder of wheel Rr. Thus, cylinder WC of wheel Rr is isolated from master cylinder 43 by valve 41c. As a result, the fluid pressure inside cylinder WC rises to a high level corresponding to the force on brake pedal 44, which opens valve 42c. Thereupon, the fluid pressure inside cylinder WC of wheel Rr decreases and unlocks the wheel.

In this embodiment, the two rear wheels are controlled in common for the braking force by control valves 41c and 42c, in consideration of the straight-advancing characteristics the vehicle, in particular.

Control valves 41a to 41c and 42a to 42c are controlled by instructions from an electronic control unit (not shown in detail) which is formed of a microcomputer or the like. The control unit is supplied with signals from rotating speed sensors of the individual wheels, and monitors the wheels for slip check. If a slip or locking of a wheel is detected, the control valve corresponding to the slipped wheel is controlled in the aforesaid manner, thereby unlocking the wheel. When the wheel unlocks, it is supplied again with fluid pressure from master cylinder 43 to increase the braking force to a proper skidding condition. Thus, braking efficiency is improved.

Figure 8:
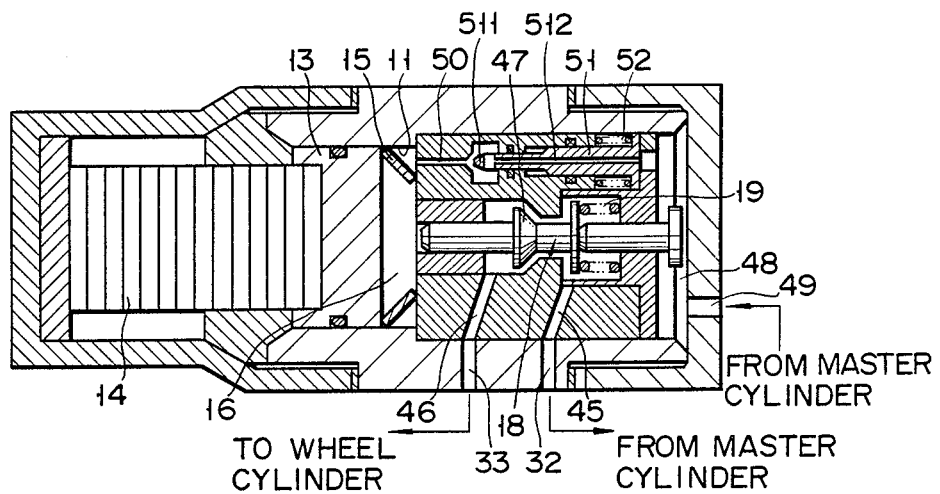
FIGS. 8 and 9 are sectional views illustrating fifth and sixth embodiments, respectively, of the control valve effectively used in the braking system of FIG. 7.

FIG. 8 shows a fifth embodiment of the control valve adapted to be effectively used in the aforementioned braking system. In FIG. 8, like reference numerals are used to designate like components as included in the embodiment shown in FIG. 2.

The control valve of this embodiment is a normally-open valve which may constitute any of control valves 41a to 41c. In this valve, valve member 18 includes valve plug 47 for connecting and disconnecting first and second ports 45 and 46 which communicate with inlet and outlet holes 32 and 33, respectively, as member 18 moves axially. Inlet hole 32 is connected to the master cylinder, and outlet hole 33 to the wheel cylinder. Thus, the control valve switches hydraulic circuits between the master and wheel cylinders.

In this control valve, moreover, if high voltage is applied to piezoelectric element group 14 so that the element group is extended to reduce the capacity of first fluid pressure chamber 16, valve member 18 is moved against the urging force of spring 19 in a manner such that valve plug 47 cuts off fluid passage between first and second ports 45 and 46.

Also, the control valve is formed with pilot fluid pressure chamber 48. Chamber 48 is supplied with a compressed fluid from pilot control hole 49, which is fed with fluid pressure from, e.g., the master cylinder. Thus, a high fluid pressure is established in fluid pressure chamber 48 especially when the brake pedal is worked strongly.

Pilot fluid pressure chamber 48 communicates with first fluid pressure chamber 16 by means of fluid leak passage 50 which constitutes a restriction mechanism for limiting the flow quantity. Passage 50 contains pilot piston 51 therein. When the fluid inside chamber 48 rises, piston 51 is driven toward chamber 16 against the urging force of spring 52, so that passage 50 is closed by valve plug 511 of piston 51.

Pilot piston 51 is formed with narrow passage 512 as a restriction extending along its axis. When passage 50 is opened by valve plug 511 of piston 51, the fluid in pilot fluid pressure chamber 48 is fed into first fluid pressure chamber 16 at a limited flow rate.

Thus, according to the control valve of this embodiment, when fluid pressure is produced in the master cylinder by operating, e.g., the brake pedal, it is transmitted through first and second ports 45 and 46, and fed into the wheel cylinder for a braking operation.

During this normal braking operation, piezoelectric element group 14 is contracted as shown in FIG. 8, without being supplied with any high voltage. Therefore, the pressure inside first fluid pressure chamber 16 is equal to that inside pilot fluid pressure chamber 48.

In this state, if the brake pedal is strongly worked to greatly increase the fluid pressure of the master cylinder, the fluid pressure of pilot fluid pressure chamber 48 also greatly increases to drive pilot piston 51 against the urging force of spring 52. Thus, fluid leak passage 50 is closed, so that first fluid pressure chamber 16 is defined as a compartment. If any of the wheels is locked by the powerful braking action, high voltage is applied to piezoelectric element group 14 to elongate the same. As the element group extends in this manner, the fluid pressure of chamber 16 rises to drive valve member 18 against the urging force of spring 19. As a result, the fluid passage between first and second ports 45 and 46 is closed.

Thus, if a braking operation with a certain intensity or more is executed to cause a slip of a wheel or wheels, fluid leak passage 50 is closed by pilot piston 51, so that first fluid pressure chamber 16 is defined as an independent compartment. When a slip is detected, high voltage is applied to piezoelectric element group 14 to effectively actuate valve member 18.

Figure 9:
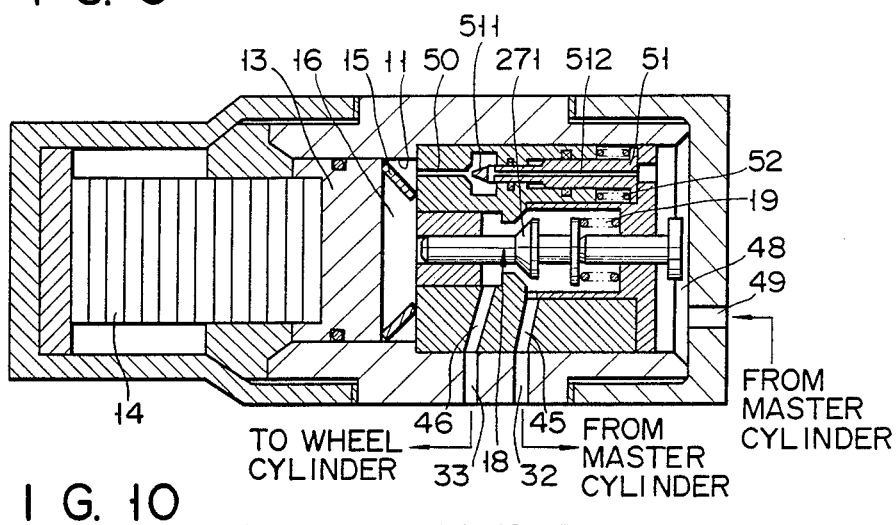

In the braking system shown in FIG. 7, there are used control valves 42a to 42c which normally are closed and are adapted to be opened when given an instruction, as well as normally-open control valves 41a to 41c as described in connection with the foregoing embodiment. FIG. 9 shows a configuration of one such normally-closed control valve. Basically, the valve of FIG. 9 has the same construction as the one shown in FIG. 8. The difference between the two valves lies only in the structure of valve member 18. In FIG. 9, valve plug 471 of valve member 18 closes the fluid passage between first and second ports 45 and 46 when it is urged toward first fluid pressure chamber 16 by spring 19. When fluid leak passage 50 is closed and if high voltage is applied to piezoelectric element group 14, therefore, valve member 18 is driven against the urging force of spring 19. Thus, a fluid passage is formed between first and second ports 45 and 46.

Figure 10:
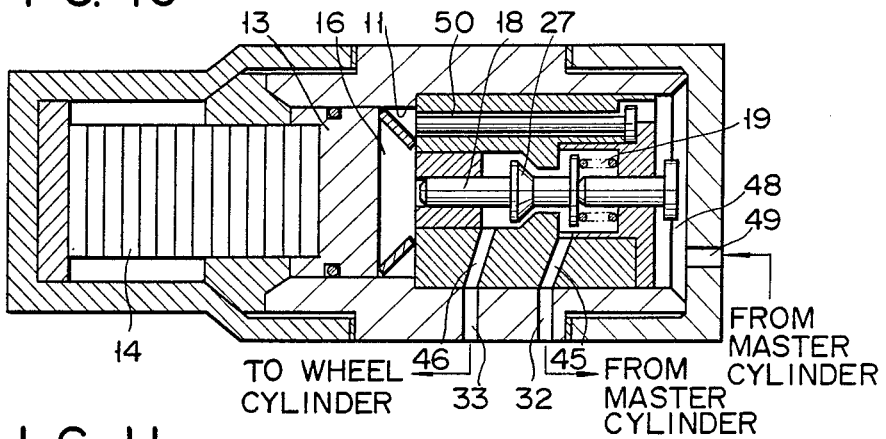
FIGS. 10 and 11 are sectional views illustrating seventh and eighth embodiments, respectively, of the control valve of the invention.

In the fifth and sixth embodiments described above, pilot fluid pressure chamber 48 and first fluid pressure chamber 16 are connected by fluid leak passage 50 which contains pilot piston 51 therein. As in a seventh embodiment shown in FIG. 10, however, passage 50 may be only disposed between chambers 48 and 16. In this control valve, the fluid pressure inside first fluid pressure chamber 16 varies following that inside pilot fluid pressure chamber 48 with delay. Thus, if high voltage is applied to piezoelectric element member 14 to drive piston 13, valve member 18 is actuated in response to the action of piston 13.

Figure 11:
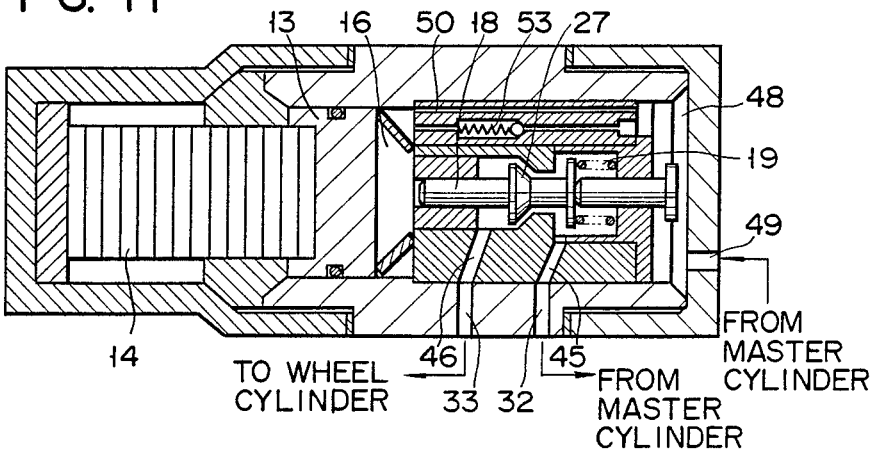

FIG. 11 shows an eighth embodiment of the invention, in which pilot fluid pressure chamber 48 and first fluid pressure chamber 16 are connected by fluid leak passage 50, and check valve 53 is disposed parallel to passage 50. In this case, valve 53 allows the fluid to flow only from chamber 48 to chamber 16. If the pressure of chamber 48 rises, that of chamber 16 follows it without delay. If high voltage is applied to element group 14 to move piston 13 in the direction to reduce the capacity of chamber 16, valve member 18 is driven with a satisfactory response characteristic.

In the embodiments described above, the valve member is switched with the piezoelectric element group extended by the impression of high voltage. Alternatively, however, it may be switched when the element group is contracted. FIG. 12 shows a further embodiment based on this concept. Basically, this embodiment is the same as the one shown in FIG. 1. In FIG. 12, valve member 18 is pushed out of first fluid pressure chamber 16 by spring 55 so as to close the fluid passage between first and second ports 20 and 21.

Normally, in this case, high voltage is applied to piezoelectric element group 14 to keep it elongated. In switching the control valve, selector valve 23 is closed, and the voltage applied to element group 14 is then cut off to contract the group. As a result, piston 13 is moved by spring mechanism 15 in the direction to increase the capacity of first fluid pressure chamber 16. Thus, valve member 18 is driven against the urging force of spring 55, defining the fluid passage between first and second ports 20 and 21.

According to this embodiment, first fluid pressure chamber 16 normally cannot be supplied with any fluid pressure from second port 21, so that it is fed with a valve 23. Spring mechanism 15 for urging piston 13 in chamber 16 toward piezoelectric element group 14 is strong enough to actuate valve member 18 against the urging force of spring 55.

What is claimed is:
1. A control valve for controlling a fluid passage, comprising:
   a case defining a first cylinder;
   a piston mechanism disposed in said first cylinder so as to be movable in the axial direction of said first cylinder;
   a first fluid pressure chamber defined in said first cylinder by said piston mechanism and being filled with fluid;

a piezoelectric element group including a plurality of laminar piezoelectric elements stacked in layers, said element group being disposed in said first cylinder and adapted to be extended and contracted when voltage is applied to said piezoelectric elements, whereby said piston mechanism is moved to vary the capacity of said first fluid pressure chamber;

said case also defining a second cylinder communicating with said first fluid pressure chamber, said second cylinder having a cross-sectional area smaller than that of said first cylinder;

a second fluid pressure chamber defined in said case, to which fluid is supplied and which is continuous with said first fluid pressure chamber via said second cylinder;

valve member means disposed in said second cylinder for being driven by the fluid pressure in said first fluid pressure chamber, said valve member means having opposite end faces on which the fluid pressures in said first and second fluid pressure chambers respectively act, the end face area of said valve member means exposed to the fluid pressure in said first fluid pressure chamber being equal to the end face area of said valve member means exposed to the fluid pressure in said second fluid pressure chamber, said valve member means further having valve means formed in a central portion thereof for opening and closing said fluid passage; and an auxiliary fluid passage at least partially defined by said valve member means for connecting said first fluid pressure chamber to said second fluid pressure chamber.

2. The control valve according to claim 1, wherein said second cylinder containing said valve member is formed with a selector passage located around said valve member, an inlet passage coupled to said selector passage and an outlet passage coupled to said selector passage, said selector, inlet and outlet passages constituting said fluid passage, and a valve plug is formed on a portion of said valve member proximate said selector passage, whereby said inlet and outlet passages connect and disconnect as said valve member moves.

3. The control valve according to claim 1, wherein said valve member means is urged toward the first fluid pressure chamber by a spring, and is driven against the urging force of the spring when the fluid pressure inside the first fluid pressure chamber rises as the piezoelectric element group extends.

4. The control valve according to claim 1, wherein said valve member means is urged away from the first fluid pressure chamber by a spring, and is driven against the urging force of the spring when the fluid pressure inside the first fluid pressure chamber is reduced as the piezo-electric element group contracts.

5. A control valve for controlling a fluid passage, comprising:

a piezoelectric element group, which is extended or contracted in response to a voltage applied thereto;

means defining a fluid pressure chamber filled with a fluid, and having a capacity thereof varied in response to the extension or contraction of the piezoelectric element group;

a valve member, which is driven by a fluid pressure variable in response to changes in the capacity of the fluid pressure chamber, for controlling the fluid passage, said valve member amplifying the displacement of the piezoelectric element group;

communication means defined in said valve member for supplying fluid from said fluid passage into the fluid pressue chamber, so that the fluid pressure chamber is filled with the fluid; and valve means, provided in at least one portion of the communication means, for controlling the amount of fluid flowing through the communication means, said valve means decreasing the amount of fluid flowing through the communication means when the piezoelectric element group is extended and increasing the amount of fluid flowing through the communication means so that a greater amount of fluid flows through the communication means when the piezoelectric element group is contracted than when the piezoelectric element is extended.

6. The control valve according to claim 5, wherein said valve means comprises a check valve which allows the fluid to flow into the fluid pressure chamber, and which prohibits the fluid from flowing out of the fluid pressure chamber, and said communication means comtprises a narrow passage connecting the fluid pressure chamber to the outside and serving as a restriction and a passage in which said check valve is provided.

7. The control valve according to claim 5, further comprising a pilot chamber for setting the pressure of the fluid supplied from the outside, and wherein, when the fluid pressure in the pilot chamber increases, the valve means is opened by the fluid pressure, such that the fluid is supplied to the fluid pressure chamber until the pressure in the fluid pressure chamber approaches the pressure in the pilot chamber.

8. The control valve according to claim 7, further comprising means for applying a voltage to said piezoelectric element before or when the pressure in the fluid pressure chamber approaches the pressure in the pilot chamber.

9. Apparatus according to claim 1, wherein said auxiliary fluid passage comprises a fluid branch passage defined in said valve member that is connected to said second fluid pressure chamber, and a narrow gap defined between said second cylinder and said valve member communicating said fluid branch passage to said first fluid pressure chamber.

10. Apparatus according to claim 1, wherein said fluid passage is at least partially defined is said valve member means, and wherein a restriction is provided in said passage within said valve member means.

11. Apparatus according to claim 1, wherein a communication passage is provided between said fluid passage and said first fluid pressure chamber, and a check valve is disposed in said passage fow allowing fluid to flow into said first fluid pressure chamber.

* * * * *